A. L. LE VINE.
LAWN MOWER.
APPLICATION FILED SEPT. 4, 1908.
913,525.
Patented Feb. 23, 1909.
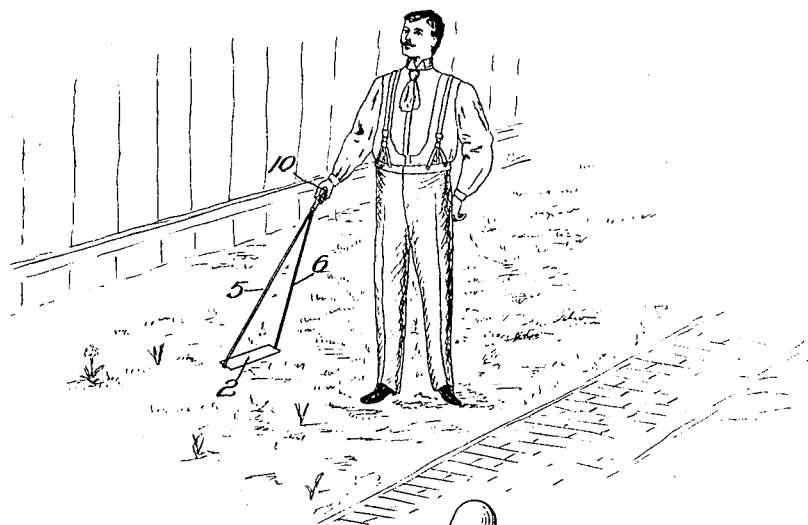
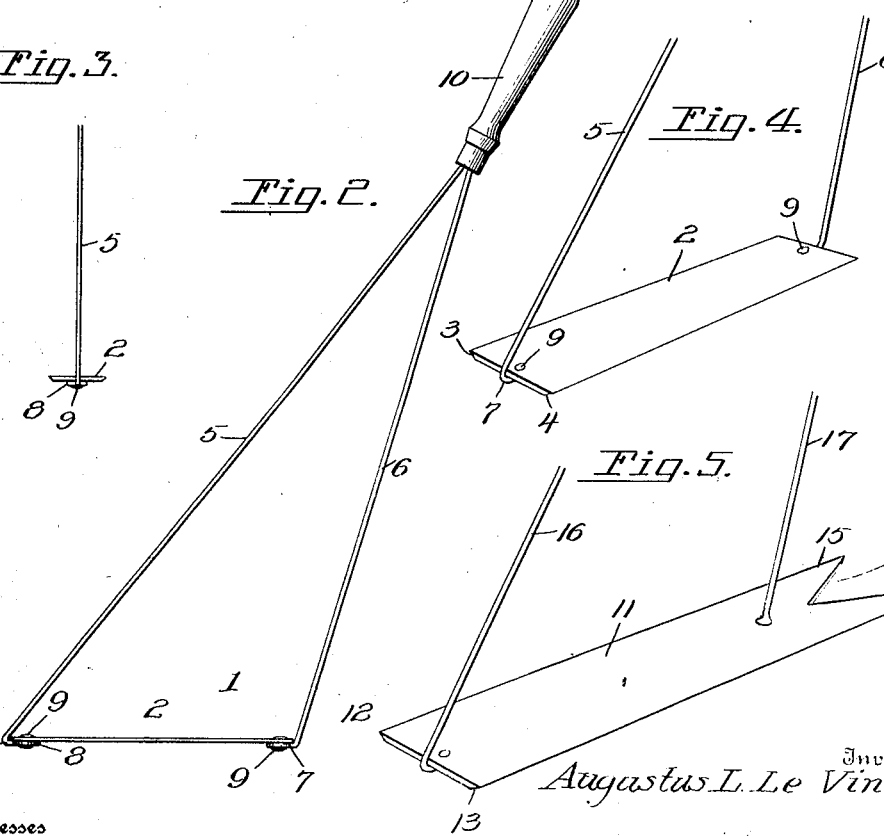

UNITED STATES PATENT OFFICE.

AUGUSTUS L. LE VINE, OF FREEHOLD, NEW JERSEY.

LAWN-MOWER.

No. 913,525.  Specification of Letters Patent.  Patented Feb. 23, 1909.

Application filed September 4, 1908. Serial No. 451,670.

*To all whom it may concern:*

Be it known that I, AUGUSTUS L. LE VINE, a citizen of the United States, residing at Freehold, in the county of Monmouth and State of New Jersey, have invented new and useful Improvements in Lawn-Mowers, of which the following is a specification.

This invention relates to lawn mowers, and has for an object to provide a simple lawn mower composed of but few parts and to construct the same so that it may be manipulated by a person when standing erect, and to provide means whereby the cutting blade may be moved or oscillated to produce somewhat of a swinging motion to effect a great cut with little exertion on the part of the operator.

A further object of the present invention is to provide a horizontally disposed cutting blade having knife edges on two sides and to provide spring arms between the handle of the device and the blade to impart a greater movement to the blade to enable the same to make an effective cut and to allow the same to move with great rapidity.

Other objects and advantages will be apparent as the nature of the invention is better disclosed, and it will be understood that changes within the scope of the claims may be resorted to without departing from the spirit of the invention.

In the drawings forming a portion of this specification and in which like numerals indicate similar parts in the several views, Figure 1 is a perspective view of the present lawn mower showing the manner of holding the same when it is to be manipulated, Fig. 2 is a side view, Fig. 3 is an end view, Fig. 4 is a perspective view, Fig. 5 is a perspective view showing a slightly modified form of my invention.

Referring now more particularly to the drawings and with particular reference to Figs. 1 to 4 inclusive there is shown a lawn mower 1 comprising a relatively narrow blade 2 preferably constructed from steel and provided with cutting edges 3 and 4 upon the longitudinal sides of the blade. Arms 5 and 6 are provided, are formed from spring wire preferably, and have their lower ends bent as shown at 7 and are provided with eyes 8 which receive rivets 9 engaged with the blade as shown. The upper ends of the arms 5 and 6 respectively are connected to a suitable handle 10. The arms 5 and 6 are disposed at a diagonal angle with respect to the blade 2 and the handle 10 is thus located in a plane rearwardly to one of the ends of the blade 2 in order that the blade may be moved back and forth in front of the operator.

Upon reference to Fig. 5, a blade 11 is shown provided with longitudinal cutting edges 12 and 13 respectively, and at one end, the blade is forked as shown at 14, to provide spur shaped teeth 15 which may be conveniently operated to remove weeds or the like. In this form of my invention the blade is provided with spring arms 16 and 17 respectively, the arm 16 being connected in a manner identical to that described to the arms 5 and 6 in the preferred form of my invention, and the arm 17 being connected to the blade inwardly of the said forked portion 14.

From the foregoing it will be seen that a simple and inexpensive device is provided which may be operated with but little exertion and which may make an effective cut in an oscillatory movement of the hand of its operator when engaged with the handle of the device as previously described. The arms 5 and 6 offer great resiliency and assist in the cutting action of the blade 2 as will be readily understood. While the arms 5 and 6 are described as being constructed from spring wire it would be obvious to form the same from any suitable spring material to accomplish the desired result. It will be seen that the arms 5 and 6 form, with the blade 2 and handle 10 respectively a frame of scalene triangular form.

Having thus described the invention, what is claimed as new, is:

1. A device of the class described comprising a cutting blade, a handle, and arms of unequal length formed from springy material rigidly secured at their lower ends to the blade and having their upper ends rigidly secured to said handle.

2. A device of the class described comprising a horizontally disposed cutting blade, a handle, and arms of unequal length formed from springy material rigidly secured at their lower ends to the ends of the blade and having their upper ends rigidly secured to said handle.

In testimony whereof I affix my signature in presence of two witnesses.

AUGUSTUS L. LE VINE.

Witnesses:
 DAVID VAUGHN,
 BERTHA RUSSELL.